455/3

Oct. 21, 1958 F. L. PUTZRATH ET AL 2,857,482

AUTOMATIC GAIN CONTROL SYSTEM

Filed Oct. 28, 1954

INVENTORS
FRANZ L. PUTZRATH &
KARL SOLOMON
BY G. A. Reckif
AGENT 2,857,482
Patented Oct. 21, 1958

2,857,482

AUTOMATIC GAIN CONTROL SYSTEM

Franz L. Putzrath, Oaklyn, and Karl Solomon, Haddon Heights, N. J., assignors to Radio Corporation of America, a corporation of Delaware Application October 28, 1954, Serial No. 465,264
15 Claims. (Cl. 179—171)

Figures 1, 2:
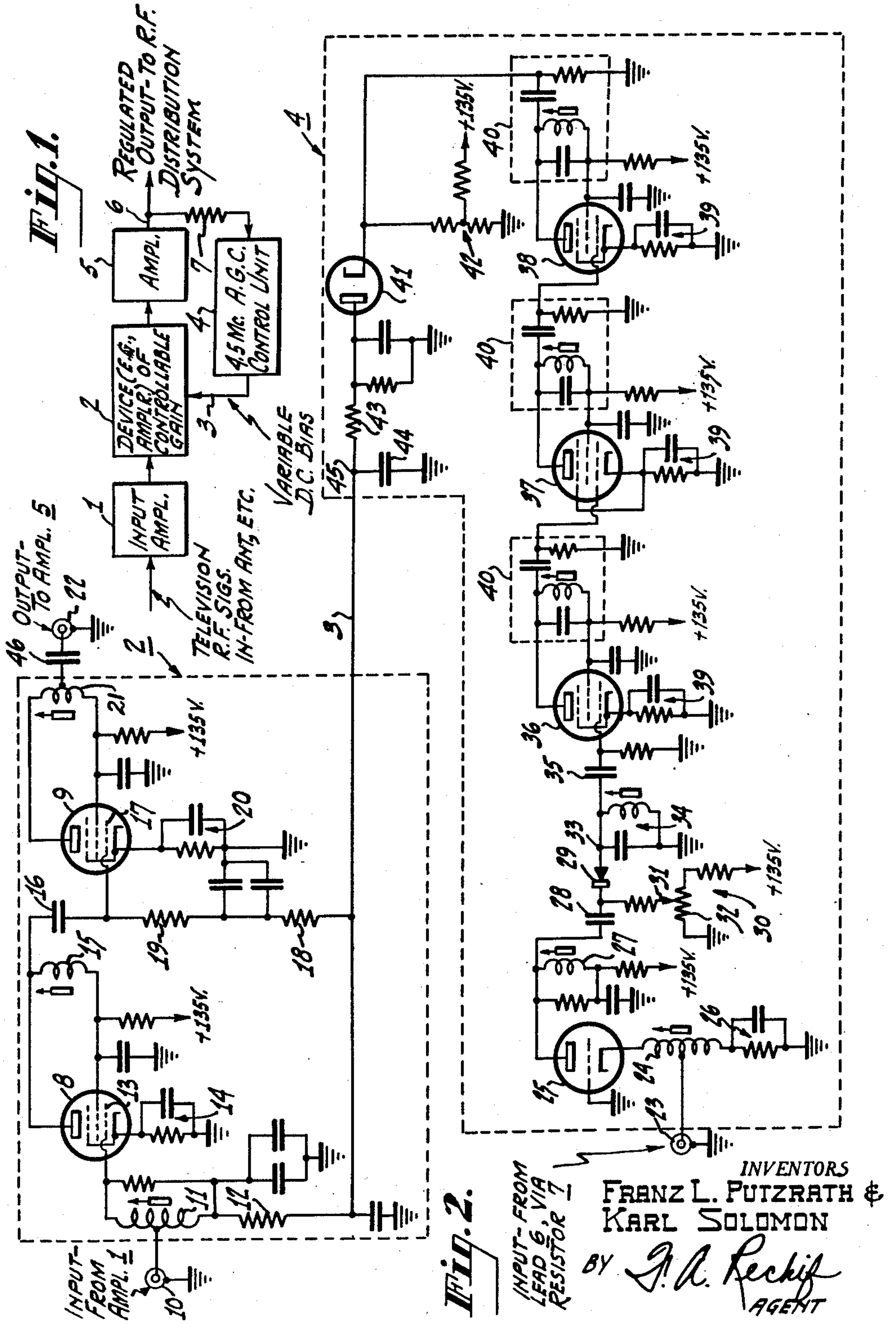

This invention relates to an automatic gain control (AGC) system, and more especially to an AGC system particularly useful in television (TV) radio frequency (R. F.) distribution systems.

Systems have been developed for receiving TV signals which have been broadcast by a plurality of different transmitters, on a single receiving antenna or single array of receiving antennas, amplifying these signals either by means of a common broadband R. F. amplifier for all TV channels or by means of separate channelized R. F. amplifiers, or a combination of broadband and channelized R. F. amplifiers, and then distributing the amplified R. F. signals by means of cables to a plurality of home-type TV receivers which are individually tunable to receive programs originating from any one of the plurality of transmitters.

The signal attenuation in certain distribution cables has a tendency to vary with temperature and also with humidity. Also, normal variations in atmospheric conditions from time to time cause the signals as received at the receiving antenna or antennas to vary in strength. Also, there may be variations of gain in the various amplifiers, due to aging of components. The result of these several effects is a considerable variation of signal strength from time to time within the system, as well as at the receivers. To counteract or substantially eliminate this variation of signal strength, it is very desirable to apply AGC to one or more of the R. F. amplifiers.

An object of this invention is to devise a novel AGC arrangement for television R. F. distribution systems.

Another object is to provide an AGC arrangement for TV R. F. distribution systems which is not frequency discriminatory, but responds to input signals of any TV channel carrier frequencies whatever, or even of a plurality of TV channel carrier frequencies.

A further object is to devise a relatively simple, standardized AGC control unit which, after a single factory alignment adjustment, will function on input signals of any TV channel carrier frequencies whatever.

The objects of this invention are accomplished, briefly, in the following manner: The TV R. F. signal output of the R. F. amplifier, of any one channel, containing related audio and video carriers spaced 4.5 mc. apart (according to the present standards established by the Federal Communications Commission), is sampled and applied to a non-linear device which produces a 4.5 mc. beat frequency signal due to the beating of the audio and video carriers. This 4.5 mc. signal is amplified and then rectified by a detector to produce a unidirectional voltage proportional to the amplitude of the carriers, which unidirectional voltage is used as the AGC voltage for a controllable-gain R. F. device (e. g., amplifier) of the distribution system. A plurality of TV signals (that is, the signals in a plurality of TV channels) may be applied to the non-linear device, and in this case a like plurality of 4.5-mc. signals are produced, the strongest one of these determining the value of the unidirectional voltage produced by the detector.

The foregoing and other objects of this invention will be best understood from the following description of an exemplification thereof, reference being had to the accompanying drawings, wherein:

Fig. 1 is a block diagram of an R. F. distribution system utilizing this invention; and Fig. 2 is a detailed circuit schematic of a portion of Fig. 1.

Referring first to Fig. 1, R. F. TV signals transmitted from remote transmitters are picked up by a suitable receiving antenna or receiving antenna array (not shown) and applied to the input side of an input R. F. amplifier 1 which may be either broadband (in case a plurality of separate TV signals are to be transmitted therethrough) or somewhat narrower-band (in case a channelized system is used, in which only a single TV signal in a single channel is to be transmitted therethrough). The input amplifier 1 may or may not be used, depending on the level of the signal available.

The signal output of amplifier 1 (or the unamplified signal from the receiving antenna, if amplifier 1 is not used) is fed to the input of a controllable-gain device 2 for passage therethrough. This device, an amplifier form of which will be described hereinafter in more detail in connection with Fig. 2, has a bandwidth sufficient to pass signals in all the high-band V. H. F. TV channels (channels 7–13, as presently constituted), or it can be designed to pass signals in all the low-band V. H. F. TV channels (channels 2–6, as presently constituted). Alternatively, in a channelized system, the device 2 could be designed to pass a TV signal in only a single channel. For the present, however, it will be assumed that a wide band system is being employed, and the description will proceed on that basis. The device 2 is constructed and arranged to have little or no change in its frequency response characteristic with a change in bias, but the gain of such device can be varied over a range of about 40 db. in dependence upon a variable D. C. bias supplied to such device by means of a connection 3 from a 4.5 mc. AGC control unit 4. The control unit 4 will be described more in detail in connection with Fig. 2.

The output of device 2 is amplified in another R. F. amplifier 5 the output of which, in turn, constitutes the output of the R. F. amplifying system disclosed in Fig. 1 and appears in an output connection 6 which is coupled to a suitable metallic circuit, such as a cable, for distribution of the R. F. TV signals to a plurality of TV receivers.

The output of amplifier 5 is sampled by means of a resistor 7 coupled between connection 6 and the input of control unit 4. The control unit 4 operates to produce a unidirectional output control voltage proportional to the amplitude of a pair of carriers fed thereto (as a portion of the output of amplifier 5). This unidirectional control voltage is fed to lead 3 and used as the bias for device 2, so that the bias applied to said device varies as this control voltage varies. The action of the AGC voltage produced by unit 4 is such as to control the gain of the device 2 to keep the output of the system at connection 6 essentially constant. In other words, the output of amplifier 5 is regulated.

In brief, the control unit 4 operates to develop a number of 4.5-mc. beat frequencies equal to the number of TV signals in the output of amplifier 5, each beat frequency resulting from beating together the audio and video carriers (which are separated by 4.5 mc. from each other) constituitng each respective TV signal. These 4.5-mc. beat frequency waves are amplified by a tuned amplifier (tuned to 4.5 mc.) in unit 4 and then detected by a detector in said unit to produce a D. C. voltage proportional to the amplitude of the largest one of these 4.5-mc. waves. This D. C. voltage is used as bias for the device 2.

Referring to Fig. 2, which illustrates by way of example a controllable-gain amplifier used for device 2, said amplifier includes two pentode vacuum tubes 8 and 9, for example of the 5654 type, connected in cascade. The input to amplifier 2 is obtained from the output of amplifier 1 by means of a coaxial line 10 which is coupled to the output of amplifier 1 and also to a tunable inductance coil 11 in the control grid circuit of the first amplifying tube 8. The variable or controllable (AGC) negative grid bias is applied to the control grid 13 of tube 8 from lead 3 by way of a resistor 12 connected between said lead and the end of inductance 11 that is remote from grid 13. In addition to the AGC bias supplied by way of lead 3, cathode self-bias is utilized for tube 8, this being provided by means of a conventional parallel RC network 14 connected between the cathode of tube 8 and ground.

The anode circuit of tube 8 includes a tunable inductance 15, and a coupling capacitor 16 is connected between the anode end of this inductance and the control grid 17 of the tube 9. The AGC negative grid bias is applied to grid 17 of tube 9 from lead 3 by way of a pair of resistors 18 and 19 connected in series between lead 3 and grid 17. Thus, both tubes 8 and 9 are provided with an AGC bias by means of lead 3, so that the gains of both these tubes are controlled by such AGC bias. In addition to the AGC bias supplied by way of lead 3, cathode self-bias is utilized for tube 9, this being provided by means of a conventional parallel RC network 20 connected between the cathode of tube 9 and ground.

The anode circuit of tube 9 includes a tunable inductance coil 21, and the output of amplifier 2 is taken off by means of a coaxial line 22 which is coupled to coil 21 by means of a capacitor 46; the output of amplifier 2 is fed to the input of amplifier 5 by means of the line 22.

As previously stated, the bandwidth of amplifier 2 is such as to include the high-band (V. H. F.) TV channels 7–13, or it can be made for the low-band (V. H. F.) TV channels 2–6. This amplifier has little or no change in its bandwidth response characteristic with a change in the bias applied thereto.

The input to the control unit 4 is obtained by sampling the output of amplifier 5, by means of a coaxial line 23 which is coupled to the resistor 7 and also to a tunable inductance coil 24 in the cathode circuit of a triode electrode structure 25 connected as a grounded-grid amplifying stage. A parallel RC self-biasing network 26 is connected between the cathode of tube 25 and ground. The amplifying stage including tube 25 serves as an isolating stage and may be omitted in some instances. Structure 25 may for example be one-half of a type 6AN8 tube.

The plurality of TV signals, each of which includes audio and video carriers separated by a predetermined frequency difference of 4.5 mc., is applied to the input of amplifying stage 25, is amplified therein, and appears across a tunable inductance 27 in the anode circuit of tube 25. The signal across inductance 27 is coupled through a coupling capacitor 28 to the input side of a suitable non-linear device, here shown as a diode 29 (for example, of the type known as 1N34A) the cathode of which is coupled to one side of capacitor 28. "Delay" characteristics, such that the input signal to diode 29 must be above a certain amplitude level before such diode will pass the same, are imparted to such diode by coupling a voltage divider biasing network 30, which supplies a positive biasing potential to the cathode of diode 29. By moving the movable arm 31 of potentiometer 32 (which latter forms a part of network 30), the bias on diode 29 may be varied, to thereby adjust the output of control unit 4.

Because of the non-linearity of device 29, each video carrier beats with its associated audio carrier in such device to produce a corresponding beat frequency wave having a frequency equal to the predetermined frequency difference between each video carrier and its associated audio carrier, namely 4.5 mc. Thus, a multiplicity of 4.5-mc. beat frequency waves appears at the output terminal 33 of device 29, this number of beat frequency waves being equal to the number of separate TV channel signals appearing at the output 6 of amplifier 5, and applied to the input of control unit 4. The particular beat frequency waves of 4.5 mc. frequency are selected by means of an LC parallel resonant circuit 34 tuned to 4.5 mc. and connected between terminal 33 and ground.

The 4.5-mc. beat frequency waves are passed through a coupling capacitor 35 and applied to the input of a first one of three cascaded amplifying stages constituting a tuned amplifier tuned to 4.5 mc. The three amplifying stages include the three respective pentode evacuated electrode structures 36, 37 and 38, of which structure 36 may be one-half of a 6AN8 tube, structure 37 may be a 6AU6 tube, and structure 38 may be one-half of a 6AS8 tube. These different tube types are used for the sake of convenience and economy. The circuits for all three amplifying tubes 36, 37 and 38 are the same in all essentials, so that only one of these circuits will be described in any detail, similar parts in the three circuits being denoted by the same reference numerals. As previously stated, the three structures 36, 37 and 38 all function as 4.5-mc. amplifier stages.

For tube 36, a parallel RC self-biasing network 39 is connected between the cathode of this tube and ground. Coupled to the anode and screen grid of tube 36 is a tunable transformer 40, which may be adjustably aligned or tuned to 4.5 mc. Transformer 40 may for example be a commercially-available transformer of the 4.5-mc. sound intermediate frequency type commonly used in home TV receivers.

The 4.5-mc. beat frequency waves are amplified by the 4.5-mc. tuned amplifier including the three stages 36, 37 and 38, and the output of the final transformer 40 is applied to the cathode of a diode 41 connected in a peak detector or peak rectifier circuit. "Delay" characteristics are also imparted to this diode 41 by coupling a voltage divider biasing network 42, which supplies a positive biasing potential, to the cathode of diode 41, which diode may be one-half of a type 6AS8 tube. This "delay" means that the 4.5-mc. signal output of the 4.5 mc. tuned amplifier will have to be above a certain level before the said signal output will be rectified by diode 41. The rectifier 41 is poled to develop a negative unidirectional voltage at its output side in response to the 4.5-mc. signals applied to its input. A rather large series resistor 43 (100,000 ohms for example) coupled to the anode of diode 41, and a rather large storage capacitor 44 (0.5 mfd., for example) connected between one end of resistor 43 and ground, result in the charging of the capacitor 44 to a potential substantially equal to the peak value of the greatest 4.5-mc. signal wave applied to the input side of diode 41. The unidirectional voltage at the terminal 45, the ungrounded terminal of capacitor 44, is thus negative with respect to ground and is proportional to the strongest of the several 4.5-mc. beat frequency waves at the output of the final 4.5-mc. tuned amplifier stage 38, this unidirectional voltage being at all times proportional to the amplitude of the carriers which beat together in device 29 to produce the 4.5-mc. beat frequency wave, in the first place.

The terminal 45 is connected to lead 3, so that the negative unidirectional voltage across capacitor 44 is used as the AGC voltage (D. C. bias which varies from time to time in accordance with the amplitude of the controlling carriers) for the controllable gain amplifier 2. The negative D. C. bias voltage on lead 3 is applied to grid 13 of amplifier tube 8 and also to grid 17 of amplifier tube 9, to control the gain of amplifier 2. When the amplitudes of the particular audio carrier and video carrier which are strongest and are therefore determining the negative AGC potential decrease, the AGC potential at terminal 45 varies in such a direction as to increase the gain of amplifier 2, and vice versa. This occurs because the sampled audio and video carriers beat together to give the 4.5-mc. signal which is amplified and then rectified by diode 41 to provide the AGC potential.

Since for any all TV channels there is a frequency difference of 4.5 mc. between audio and video carriers and since the beat frequency between these carriers is amplified, detected and used for AGC purposes in the present invention, the control unit 4, with its 4.5-mc. tuned amplifier therein, need be factory-tuned or aligned only to 4.5 mc. for use on any one or all TV channels, thus eliminating the tuning to a particular desired channel that was necessary with previous AGC control units. The control unit of the present invention is thus not frequency discriminatory as between TV channels.

If the device 2 is a channelized amplifier (that is if only a single TV channel signal is being amplified therein), the action of control unit 4 is substantially the same as previously described. In this case, the audio and video carriers of only a single channel are applied to the input of unit 4, but these beat in non-linear device 29 to give a 4.5-mc. beat frequency wave which is amplified in the 4.5-mc. tuned amplifier, and then rectified by diode 41 to give the desired negative AGC voltage at terminal 45, on lead 3.

The system as previously described controls on the intermodulation of the video and audio carriers, since the 4.5-mc. control signal is developed by the beating together of these two carriers. This intermodulation is in some cases a type of distortion which is objectionable in TV. It is within the scope of this invention to develop the control signal by beating together any fixed pair of carriers which may be present in a standard TV signal, this pair not being necessarily limited to the audio and video carriers. For example, the control signal might be developed (in a color TV system) by beating together the color subcarrier and the sound carrier, in which case a beat frequency of 920 kc. would be developed. Then, the unit 4 would be operating at 920 kc. and would include an amplifier tuned to 920 kc., rather than to 4.5 mc.

In some cases, it might be desirable to introduce one or more carriers into the standard TV signal, as transmitted, thereby developing a fixed beat frequency when these latter (introduced) carriers beat between themselves, or beat with carriers in the standard TV signal. In such cases, of course, the control unit 4, with its tuned amplifier, would be designed to operate at the proper beat frequency.

Although the AGC system of this invention has been described in connection with TV R. F. distribution systems, it is not to be considered limited thereto. It might be applicable to monochrome or color TV receivers per se.

What is claimed is:

1. In amplifying apparatus for television signals wherein each television signal includes at least two carriers separated by a predetermined frequency difference: an automatic gain control arrangement comprising broadband means to pass a plurality of said signals simultaneously, means for heterodyning the two carriers of each of said signals with each other to produce a beat frequency wave for each of said signals having a frequency equal to said frequency difference, means for amplifying said beat frequency waves, means for rectifying the amplified beat frequency waves to produce a unidirectional voltage proportional to the amplitude of said carriers, and means for utilizing said unidirectional voltage.

2. Apparatus in accordance with claim 1, including also means for biasing the rectifying means to rectify only beat frequency waves above a predetermined amplitude.

3. In amplifying apparatus for television signals wherein each television signal includes at least two carriers separated by a predetermined frequency difference: an automatic gain control arrangement comprising broadband means to pass a plurality of said signals simultaneously, means for heterodyning the two carriers of each of said signals with each other to produce a beat frequency wave for each of said signals having a frequency equal to said frequency difference, means for amplifying said beat frequency waves, means for rectifying the amplified beat frequency waves to produce a unidirectional voltage proportional to the amplitude of said carriers, means for filtering said unidirectional voltage, and output connections coupled to said filtering means for enabling utilization of the filtered voltage.

4. In amplifying apparatus for television signals wherein each television signal includes at least two carriers separated by a predetermined frequency difference: an automatic gain control arrangement comprising broadband means to pass a plurality of said signals simultaneously, a non-linear device, means for applying both of said carriers of each of said signals to said device, a tuned amplifier coupled to the output of said device, a rectifier coupled to the output of said amplifier for producing from such output a unidirectional voltage, and means for utilizing said unidirectional voltage.

5. Apparatus in accordance with claim 4, including also means for biasing said non-linear device to impart delay characteristics thereto.

6. Apparatus in accordance with claim 4, including also means for biasing said rectifier to impart delay characteristics thereto.

7. Apparatus in accordance with claim 4, including also means for biasing said non-linear device to impart delay characteristics thereto, and means for biasing said rectifier to impart delay characteristics thereto.

8. In amplifying apparatus for television signals wherein each television signal includes at least two carriers separated by a predetermined frequency difference: an automatic gain control arrangement comprising broadband means to pass a plurality of said signals simultaneously, a non-linear device, means for applying both of said carriers of each of said signals to said device, a tuned amplifier coupled to the output of said device, a rectifier coupled to the output of said amplifier for producing from such output a unidirectional voltage, a smoothing filter coupled to the output side of said rectifier, and output connections coupled to said filter.

9. In amplifying apparatus for television signals wherein each television signal includes at least two carriers separated by a predetermined frequency difference: a controllable-gain device having broadband means for passing all of said signals simultaneously; an automatic gain control arrangement for said device comprising means for sampling the output of said device, means coupled to said sampling means for heterodyning the two carriers of each of said signals with each other to produce a beat frequency wave for each of said signals having a frequency equal to said frequency difference, means for amplifying said beat frequency waves, and means for rectifying the amplified beat frequency waves to produce a unidirectional voltage proportional to the amplitude of said carriers; and means for applying said voltage to said controllable-gain device to control the gain thereof automatically.

10. In amplifying apparatus for television signals wherein each television signal includes at least two carriers separated by a predetermined frequency difference: a controllable-gain device having broadband means for passing all of said signals simultaneously; an automatic gain control arrangement for said device comprising means for sampling the output of said device, means coupled to said sampling means for heterodyning the two carriers of each of said signals with each other to produce a beat frequency wave for each of said signals having a frequency equal to said frequency difference, means for amplifying said beat frequency waves, means for rectifying the amplified beat frequency waves to produce a unidirectional voltage proportional to the amplitude of said carriers, and means for filtering said voltage; and means for applying the filtered voltage to said controllable-gain device as an automatic gain control voltage therefor.

11. In amplifying apparatus for television signals wherein each television signal includes related video and audio signals on separate carriers separated by a predetermined frequency difference: a controllable-gain device having broadband means for passing all of said signals simultaneously; an automatic gain control arrangement for said device comprising means for sampling the output of said device, a non-linear device coupled to said sampling means, a tuned amplifier coupled to the output of said last-named device, and a rectifier coupled to the output of said amplifier for producing from such output a unidirectional voltage; and means for applying said voltage to said controllable-gain device to control the gain thereof automatically.

12. In amplifying apparatus for television signals wherein each television signal includes related video and audio signals on separate carriers separated by a predetermined frequency difference: a controllable-gain amplifier having broadband means for amplifying all of said signals simultaneously; an automatic gain control arrangement for said amplifier comprising means for sampling the output of said amplifier, a non-linear device coupled to said sampling means, a tuned amplifier coupled to the output of said device, a rectifier coupled to the output of said amplifier for producing from such output a unidirectional voltage, and a smoothing filter coupled to the output side of said rectifier; and means for applying the filtered voltage to said controllable-gain amplifier as an automatic gain control voltage therefor.

13. Apparatus in accordance with claim 12, including also means for biasing said non-linear device to impart delay characteristics thereto.

14. Apparatus in accordance with claim 12, including also means for biasing said rectifier to impart delay characteristics thereto.

15. Apparatus in accordance with claim 12, including also means for biasing said non-linear device to impart delay characteristics thereto, and means for biasing said rectifier to impart delay characteristics thereto.

References Cited in the file of this patent

UNITED STATES PATENTS 2,632,047 Schlesinger ------------ Mar. 17, 1953